(12) United States Patent
Chen

(10) Patent No.: US 7,423,872 B2
(45) Date of Patent: Sep. 9, 2008

(54) AIR SHROUD INSTALLED ON A CIRCUIT BOARD

(75) Inventor: Richard Chen, San Jose, CA (US)

(73) Assignee: Super Micro Computer, Inc., San Jose, CA (US)

( * ) Notice: Subject to any disclaimer, the term of this patent is extended or adjusted under 35 U.S.C. 154(b) by 132 days.

(21) Appl. No.: 11/400,184

(22) Filed: Apr. 10, 2006

(65) Prior Publication Data

US 2007/0263371 A1  Nov. 15, 2007

(51) Int. Cl.
*H05K 7/20* (2006.01)
*H05K 5/00* (2006.01)

(52) U.S. Cl. .................. 361/695; 361/692; 361/694; 361/719; 454/184

(58) Field of Classification Search ........... 361/690, 361/692, 694–695, 719; 454/184
See application file for complete search history.

(56) References Cited

U.S. PATENT DOCUMENTS

| | | | | |
|---|---|---|---|---|
| 5,523,917 A | * | 6/1996 | Searby | .......... 361/687 |
| 6,315,655 B1 | * | 11/2001 | McEwan et al. | .......... 454/184 |
| 6,452,797 B1 | * | 9/2002 | Konstad | .......... 361/695 |
| 6,661,665 B2 | * | 12/2003 | Tantoush et al. | .......... 361/719 |
| 7,002,797 B1 | * | 2/2006 | Wittig | .......... 361/695 |
| 2007/0121289 A1 | * | 5/2007 | Peng | .......... 361/695 |
| 2007/0133178 A1 | * | 6/2007 | Han | .......... 361/719 |
| 2007/0230117 A1 | * | 10/2007 | Chang et al. | .......... 361/690 |

FOREIGN PATENT DOCUMENTS

KR   2002018359 A   *  3/2002

* cited by examiner

*Primary Examiner*—Jaypraksh N Gandhi
*Assistant Examiner*—Robert J Hoffberg
(74) *Attorney, Agent, or Firm*—Troxell Law Office, PLLC

(57) ABSTRACT

A air shroud installed on a circuit board is composed of a circuit board which is installed with an outer housing, an inner surface of which is connected with at least more than one fan, and a side of which is provided with an air exit. The fan is provided with an air entrance and an air exit, wherein the air exit is corresponding to the air exit of outer housing. Air sucked in by the air entrance of fan is expelled out of the air exit of outer housing to be exported, through the air exit of fan, such that the air can be led to another space area or be used to dissipate heat from a specific electronic component.

7 Claims, 5 Drawing Sheets

AIR SHROUD INSTALLED ON A CIRCUIT BOARD

BACKGROUND OF THE INVENTION a) Field of the Invention

The present invention relates to a air shroud installed on a circuit board, and more particularly to a air shroud which can suck and accumulate air in a space on a circuit board and expel it along a specific direction, so as to provide the expelled air flow to a specific space or to a specific electronic component for dissipating heat.

b) Description of the Prior Art

It is well known that a conventional computer motherboard, especially a motherboard of an industrial computer, is welded with a large quantity of chips, central processing units, and memories, which can be distributed among different compartments and positions. However, as both a space along a suction direction and a space along an expelling direction of a fan are extremely large, it is unable to lead air flow in a higher speed to aim at an area or electronic component requiring more heat dissipation for dissipating the heat. In other words, if it is required to dissipate heat for more areas or electronic components, more fans need to be added to solve this kind of problem, which will increase a cost of fan, and will also consider that whether there is sufficient space inside the computer casing for installing more fans.

Accordingly, how to suck and accumulate air on the computer motherboard and expel it in a higher speed and along a specific direction is an issue to be solved by the inventor.

SUMMARY OF THE INVENTION

Accordingly, the primary object of present invention- is to provide a air shroud installed on a circuit board which can rapidly suck air in a local space on a circuit board upward and expel it along an exit of air shroud, in order to provide the air with a fast speed and a specific flowing direction, so as to expel the air into another space area or to dissipate heat from a specific electronic component.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
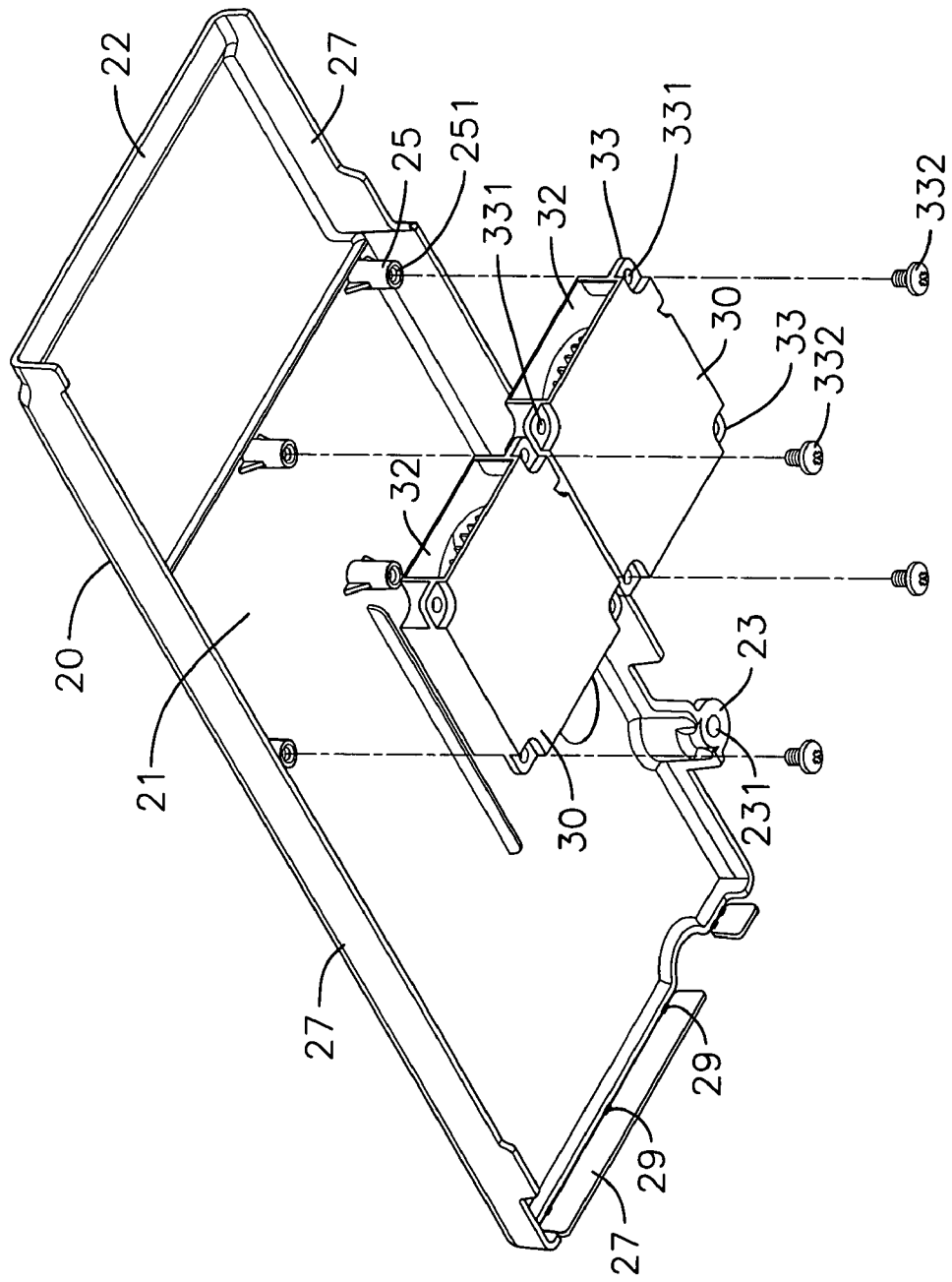
FIG. 1 shows an exploded view of components of the present invention.
Figure 2:
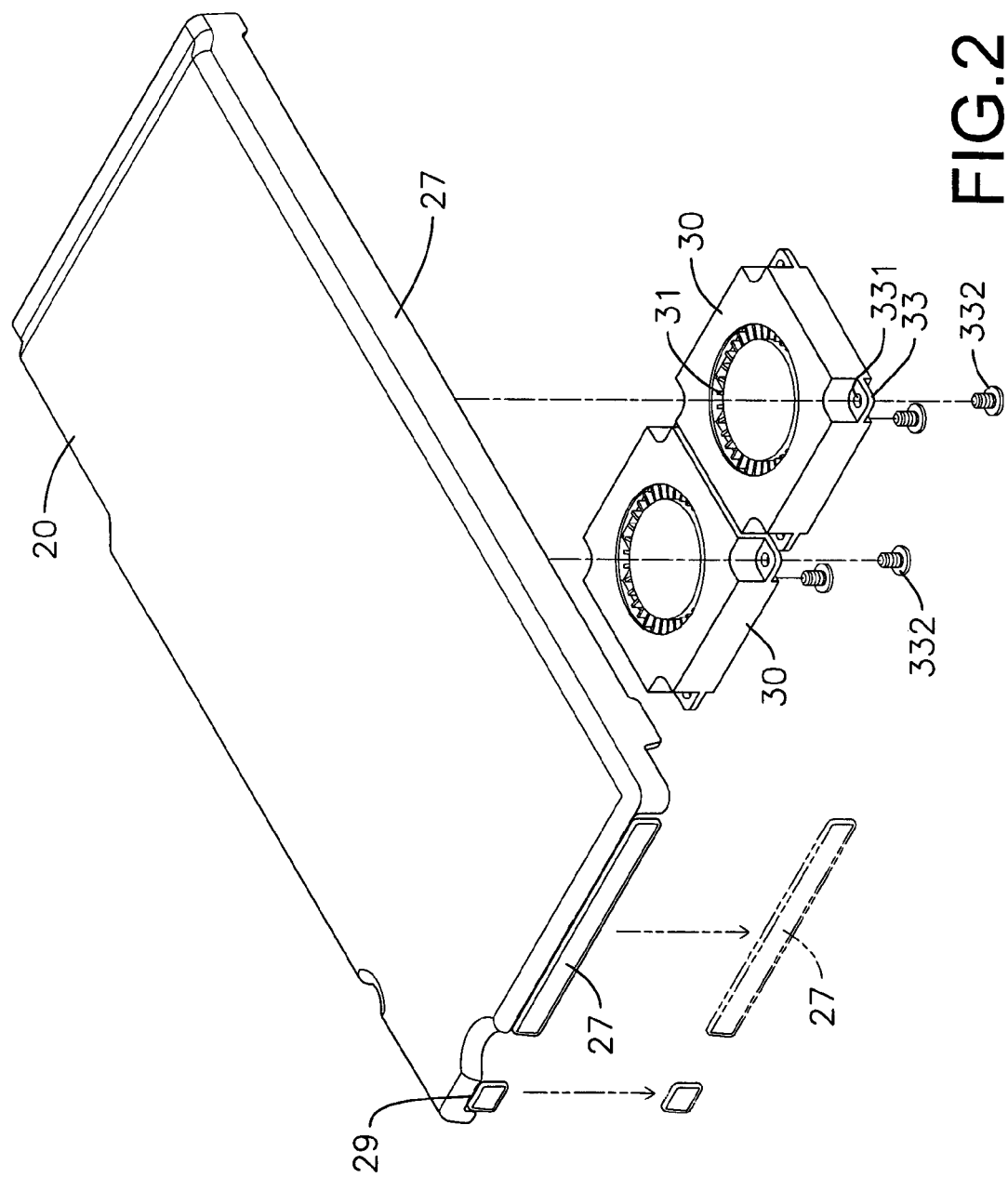
FIG. 2 shows another exploded view of components of the present invention.
Figure 3:
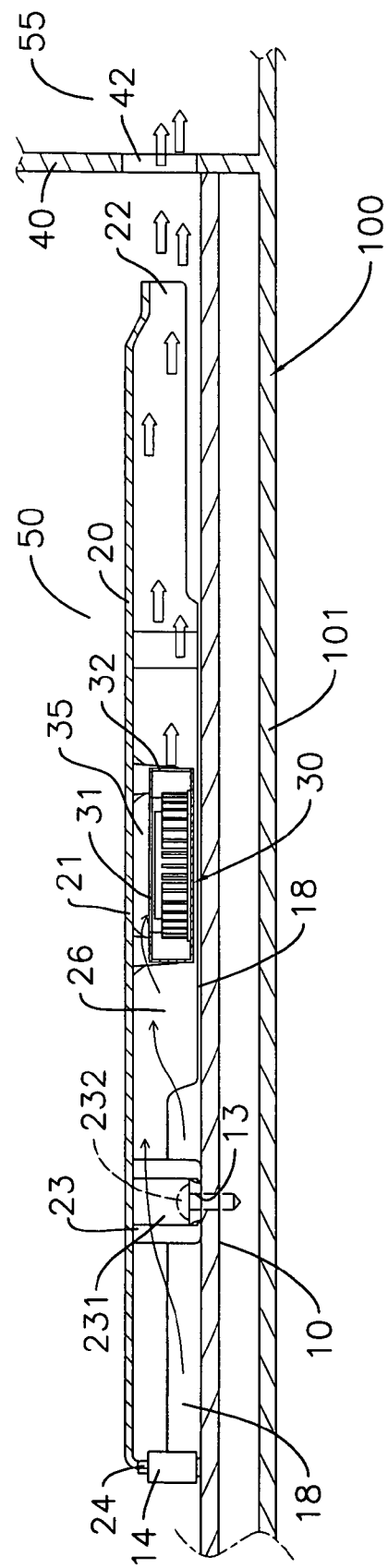
FIG. 3 shows a local cross sectional view of an implementation to an interior of computer casing of the present invention.

Referring to FIGS. 1 to 3, the present invention is to provide a air shroud installed on a circuit board, including an outer housing 20, which is installed on a circuit board 10, an inner surface of which is connected with at least more than one fan 30, and a side of which is provided with an air exit 22; the fans 30 which are provided with air entrances 31 and air exits 32 (as shown in FIG. 1 and FIG. 2), wherein the air exits 32 are corresponding to the air exit 22 of outer housing 22. Air sucked in by the air entrances 31 of fans 30 is expelled out of the air exit 22 of outer housing 20 to be exported, through the air exits 32.

Referring to FIGS. 1 to 3, the outer housing 20 is a rectangular casing which is provided with at least one connection seat 23 having a through-hole 231, and is screwed onto the circuit board 10 through a bolt 232. The outer housing 20 is installed on the circuit board 10, and a gap 18 is formed between the outer housing 20 and the circuit board 10. A space between the gap 18 and the air exit 22 forms a passage 26 for air flow, and the air is sucked into the air entrances 31 of fans 30 through the gap 18, and is then expelled out of the air exits 32.

Referring to FIGS. 1 to 3, an inner surface 21 of the outer housing 20 is provided with a plurality of pillars 25, and connection members 33 at sides of the fans 30 are provided with through-holes 331. The fan 30 is a vortex fan and is installed on the inner surface 21 of outer housing 20 through a bolt 332. A gap 35 is formed between the air entrances 31 of fans 30 and the inner surface 21, and the air flowing above the circuit board 10 can be sucked into the air entrances 31 through the gap 35.

Referring to FIGS. 1 to 3, sides of the outer housing 20 are installed with vertically extended side walls 27, with the gap 18 being formed between the side walls 27 and the circuit board 10.

At least one of the side walls 27 is connected with the outer housing 20 by a thinner connection member 29 which can be easily broken, to separate the side wall 27 from the outer housing 20, thereby forming a notch 24.

Figure 4:
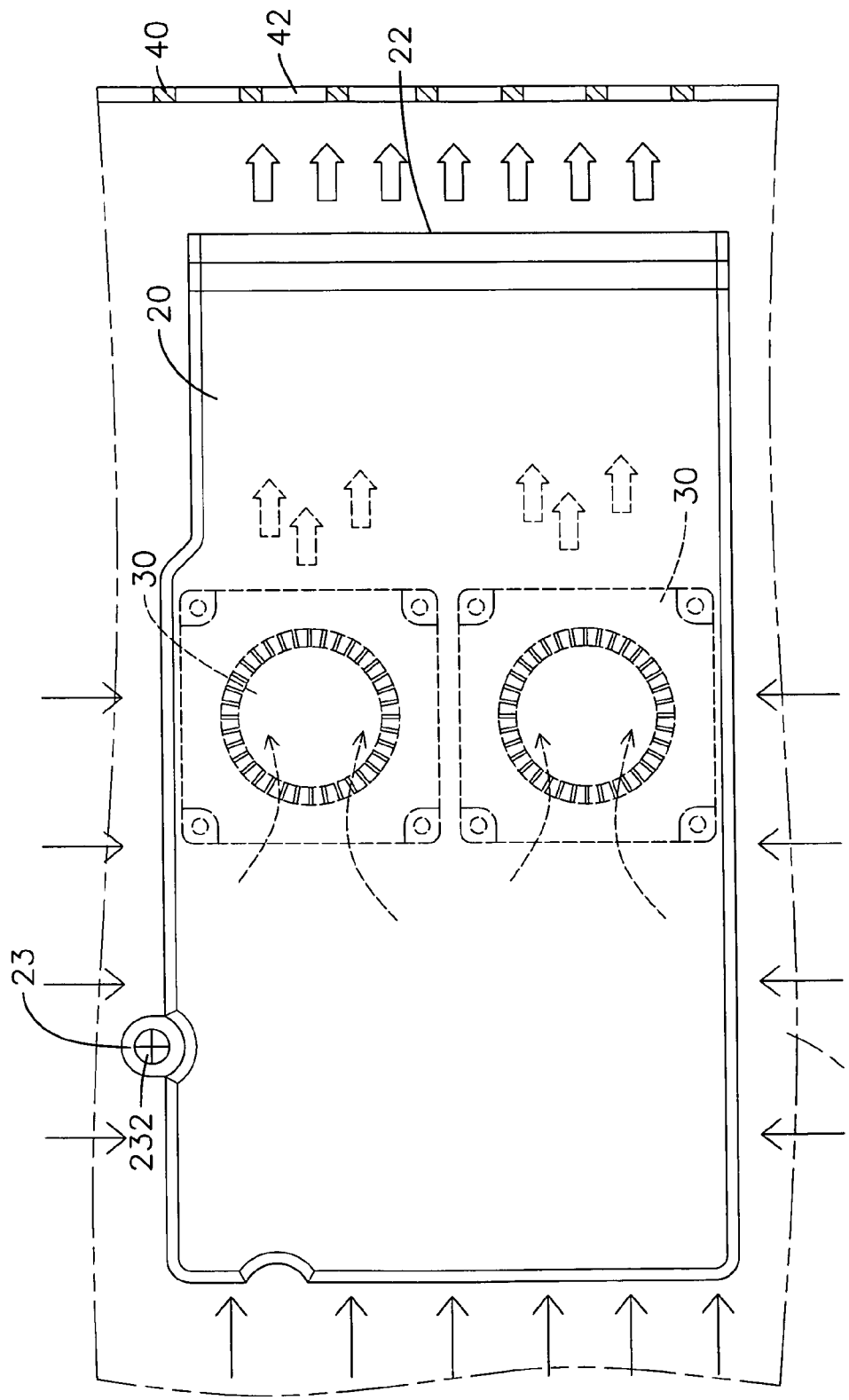
FIG. 4 shows a local bottom view of an implementation to an interior of computer casing of the present invention.
Figure 5:
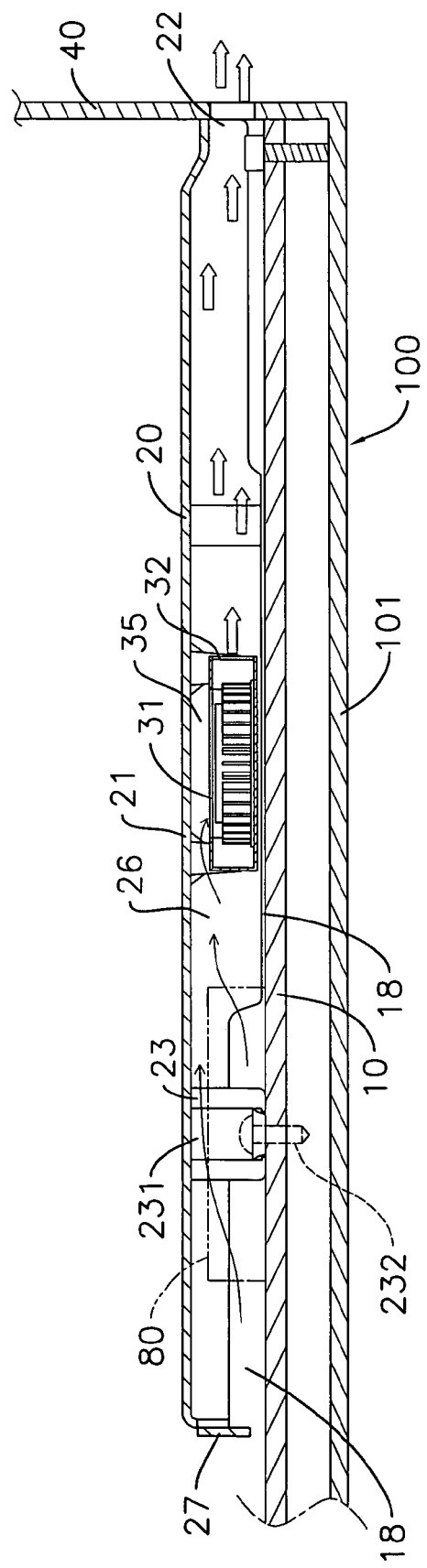
FIG. 5 shows another local cross sectional view of an implementation to an interior of computer casing of the present invention.

Referring to FIGS. 3 to 5, the circuit board 10 is installed on a substrate 101 of a modularized computer casing 100, an interior of which is provided with a vertical baffle 40 having through-holes 42. The through-holes 42 are corresponding to the air exit 22 of outer housing 20, and the high speed air expelled out of the air exit 22 can be blown into and expelled out of the through-holes 42.

An electronic component 80 is welded on the circuit board 10 (as shown in FIG. 5) and is located in an interior of the outer housing 20. The electronic component 80 can be a central processing unit, a chip set, a memory, or a fin. The high speed air is rapidly sucked in from the gap 18 and is rapidly flowing in the passage 26, and is then flowing out of the air exit 22 to rapidly blow toward the electronic component 80, so as to reduce a working temperature of the electronic component 80.

Referring to FIG. 1 and FIG. 2, two vortex fans 30, (30) are fixed on an inner surface 21 of an outer housing 20, by screwing bolts 332 into through-holes 331 and screw-holes 251 in pillars 25, wherein inner surfaces of the vortex fans 30, (30) are formed with air entrances 31, and sides of the vortex fans 30, (30) are formed with air exits 32 which are corresponding to an air exit 22 of outer housing 20. Side walls 27 are vertically surrounding three peripheries of the outer housing 20, and at least one of the side walls 27 is provided with a thinner connection member 29, such that the side wall 27 can be easily broken with fingers, which enables the side wall 27 to be separated from the outer housing 20, thereby forming a notch 24 (as shown in FIG. 3) which is used to emplace an obstacle object 14, so as to successfully install the outer housing 20 on a computer circuit board 10, when the outer housing 20 is covered on the computer circuit board 10 and is met with the obstacle object 14 (e.g., an electronic component) which is protruded on the circuit board 10.

Referring to FIG. 3 and FIG. 4, bolts 232 are screwed into through-holes 231 and preset screw holes 13 on the circuit board 10, to install the outer housing 20 on the circuit board 10. The circuit board 10 is installed on a substrate 101 of a modularized metal casing 100, and a gap 18 is formed between the outer housing 20 and the circuit board 10. A passage 26 for air flow is formed between the gap 18 and the air exit 22. A vertical baffle 40 is installed on the substrate 101 to form a compartment, with a left space of the baffle 40 being defined as a first space 50, while a right space of the baffle 40 being defined as a second space 55, and is provided with through-holes 42 for air flow. When the vortex fans 30, (30) are activated, air in the first space 50 will be rapidly sucked into the passage 26 and entered into the air entrances 31, and is then expelled out of the air exit 22 and passed through the through-holes 42, so as to feed the air in the first space 50 into the second space 55 to be used by the second space 55.

Referring to FIG. 5, a chip set 80 is located below the outer housing 20, and fast-flowing air which is sucked into the passage 26 through the gap 18 can blow toward peripheries of the chip set 80, thereby reducing a working temperature of the chip set 80.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. An air shroud installed on a circuit board, the air shroud comprising:
   a) an outer housing having:
      i) an interior surface having a plurality of pillars extending downwardly toward the circuit board;
      ii) at least two side walls extending downwardly from the interior surface; and
      iii) an outer housing air exit located in a first side wall of the at least two side walls; and
   b) a plurality of fans located in an interior of the outer housing, each of the plurality of fans is connected to a top of each of a predetermined number of the plurality of pillars and has:
      i) a fan air entrance; and
      ii) a fan air exit corresponding with the outer housing air exit;
   wherein the inner surface of the outer housing is spaced apart from the circuit board, a passage being formed between the inner surface of the outer housing and the circuit board, the fan air entrance and the fan air exit communicate with the passage, air discharged by the fan through the fan air exit flows out of the outer housing through the outer housing air exit,
   wherein the plurality of fans are spaced apart from the interior surface of the outer housing and the printed circuit board by the plurality of pillars.

2. The air shroud according to claim 1, further comprising a bolt, the outer housing is a rectangular casing having at least one connection seat having a through hole, the outer housing is connected to the circuit board by inserting the bolt through the through hole and connecting the bolt to the circuit board.

3. The air shroud according to claim 1, wherein each of the plurality of fans is a vortex fan, a gap is formed between the plurality of fans and the interior surface of the outer housing, the fan air entrance of each of the plurality of fans communicating with the gap.

4. The air shroud according to claim 1, wherein the at least two side walls includes a side wall gap formed between the at least two side walls and the circuit board.

5. The air shroud according to claim 1, wherein a second side wall of the at least two side walls has a thinner connection member located on a peripheral edge thereof and being breakable allowing the second side wall to be selectively removed from the outer housing, and a notch being formed in the outer housing when the second side wall is removed.

6. The air shroud according to claim 1, wherein the circuit board is located on a substrate of a computer casing, the outer housing air exit of the outer housing aligning with and discharging an air flow through a discharge hole of a vertical baffle of the computer casing.

7. The air shroud according to claim 1, wherein the circuit board has an electronic device located thereon and positioned with in the interior of the outer housing, the electronic device is selected from a group consisting of a central processing unit, a chip set, and a memory, the plurality of fans drawing air surrounding the electronic device thereby reducing a working temperature of the electronic device.

* * * * *